(12) United States Patent
Zaghib et al.

(10) Patent No.: US 8,048,561 B2
(45) Date of Patent: Nov. 1, 2011

(54) PROCESS FOR THE PREPARATION OF AN ELECTRODE FROM A POROUS MATERIAL, ELECTRODE THUS OBTAINED AND CORRESPONDING ELECTROCHEMICAL SYSTEM

(75) Inventors: Karim Zaghib, Longueuil (CA);
Abdelbast Guerfi, Brossard (CA);
Patrick Charest, Sainte-Julie (CA);
Robert Kostecki, Lafayette, CA (US);
Kimio Kinoshita, Cupertino, CA (US);
Michel Armand, Montreal (CA)

(73) Assignee: Hydro-Quebec, Montreal, Quebec (CA)

( * ) Notice: Subject to any disclaimer, the term of this patent is extended or adjusted under 35 U.S.C. 154(b) by 897 days.

(21) Appl. No.: 10/561,845

(22) PCT Filed: Jun. 25, 2004

(86) PCT No.: PCT/CA2004/000956
§ 371 (c)(1),
(2), (4) Date: Jan. 22, 2007

(87) PCT Pub. No.: WO2004/114437
PCT Pub. Date: Dec. 29, 2004

(65) Prior Publication Data
US 2007/0154805 A1     Jul. 5, 2007

(30) Foreign Application Priority Data
Jun. 25, 2003   (CA) .................................. 2432397

(51) Int. Cl.
*H01M 4/02*     (2006.01)
*H01M 4/00*     (2006.01)
*H01M 4/50*     (2006.01)
*H01M 4/58*     (2006.01)

(52) U.S. Cl. .................... 429/209; 429/221; 429/231.1; 429/223; 429/224; 429/231.3

(58) Field of Classification Search ........................ None
See application file for complete search history.

(56) References Cited

U.S. PATENT DOCUMENTS

| | | | |
|---|---|---|---|
| 4,285,828 A | 8/1981 | Knodler et al. |
| 4,330,601 A | 5/1982 | Dey |
| 4,489,143 A | 12/1984 | Gilbert et al. |
| 4,590,840 A | 5/1986 | Proulx et al. |

(Continued)

FOREIGN PATENT DOCUMENTS

CA     1 222 543     6/1987

(Continued)

OTHER PUBLICATIONS

English translation of International Preliminary Report on Patentability issued in PCT/CA2004/000956 dated Jun. 22, 2006.

(Continued)

*Primary Examiner* — Emily Le
*Assistant Examiner* — Sarah A Slifka
(74) *Attorney, Agent, or Firm* — Buchanan Ingersoll & Rooney, P.C.

(57) ABSTRACT

Process for the preparation of electrodes from a porous material making it possible to obtain electrodes that are useful in electrochemical systems and that have at least one of the following properties: a high capacity in mAh/gram, a high capacity in mAh/liter, a good capacity for cycling, a low rate of self discharge, and a good environmental tolerance.

21 Claims, 4 Drawing Sheets

U.S. PATENT DOCUMENTS

2002/0182479 A1    12/2002    Mallari et al.
2004/0214085 A1    10/2004    Sheem et al.

FOREIGN PATENT DOCUMENTS

| CA | 2 099 524 | | 5/1999 |
|----|-----------|---|--------|
| CA | 2 099 526 | | 6/2005 |
| EP | 1213778 | * | 6/2002 |
| EP | 1 596 460 A1 | | 11/2005 |
| JP | 2004/214054 | | 7/2004 |
| WO | 2004/064189 A1 | | 7/2004 |

OTHER PUBLICATIONS

Shin, H.C. et al., "Porous silicon-based electrodes for lithium batteries", Electrochemical Society Proceedings, Electrochemical Society, Pennington, NJ, vol. 2002-26, 2002, pp. 518-525.

Weydanz W.J. et al., "A room temperature study of the binary lithium-silicon and the ternary lithium-chromium-silicon system for use in rechargeable lithium batteries", Journal of Power Sources, Elsevier Sequoia S.A. Lausanne, CH, vol. 81-82, Sep. 1999, pp. 237-242.

Bourderau S. et al., "Amorphous silicon as a possible anode material for Li-ion batteries", Journal of Power Sources, Elsevier Sequoia S.A. Lausanne, CH, vol. 82-82, Sep. 1999, pp. 233-236.

PCT/ISA/210—International Search Report dated Sep. 29, 2005.

Printout of Webpage for 2nd ABA BRNO 2001 Conference, Jun. 17-21, 2001 (conference dates), webpage printed on Dec. 29, 2010, http://www.aba-brno.cz/starsi_rocniky/aba2001/index.html.

"1st ABA—reports" (list of reports), *ABA BRNO 2000 Conference*, Aug. 28-Sep. 1, 2000 (conference dates), pp. 1-6, printed on Dec. 22, 2010, http://www.aba-brno.cz/starsi_rocniky/aba2000/prispeyky.html#I.

Přidal, J., et al., "Thin Film Components For Li-ion Microbatteries," *ABA BRNO Conference*, pp. 3-1 to 3-7, 2000 (potentially), Czech Republic.

Martin-Litas, I., et al., "Electrochemical properties of tungsten oxysulphide thin films as positive electrode for lithium microbatteries," *Bull. Material Sci*, Dec. 2003, pp. 673-681, vol. 26, No. 7, Indian Academy of Sciences, India.

* cited by examiner

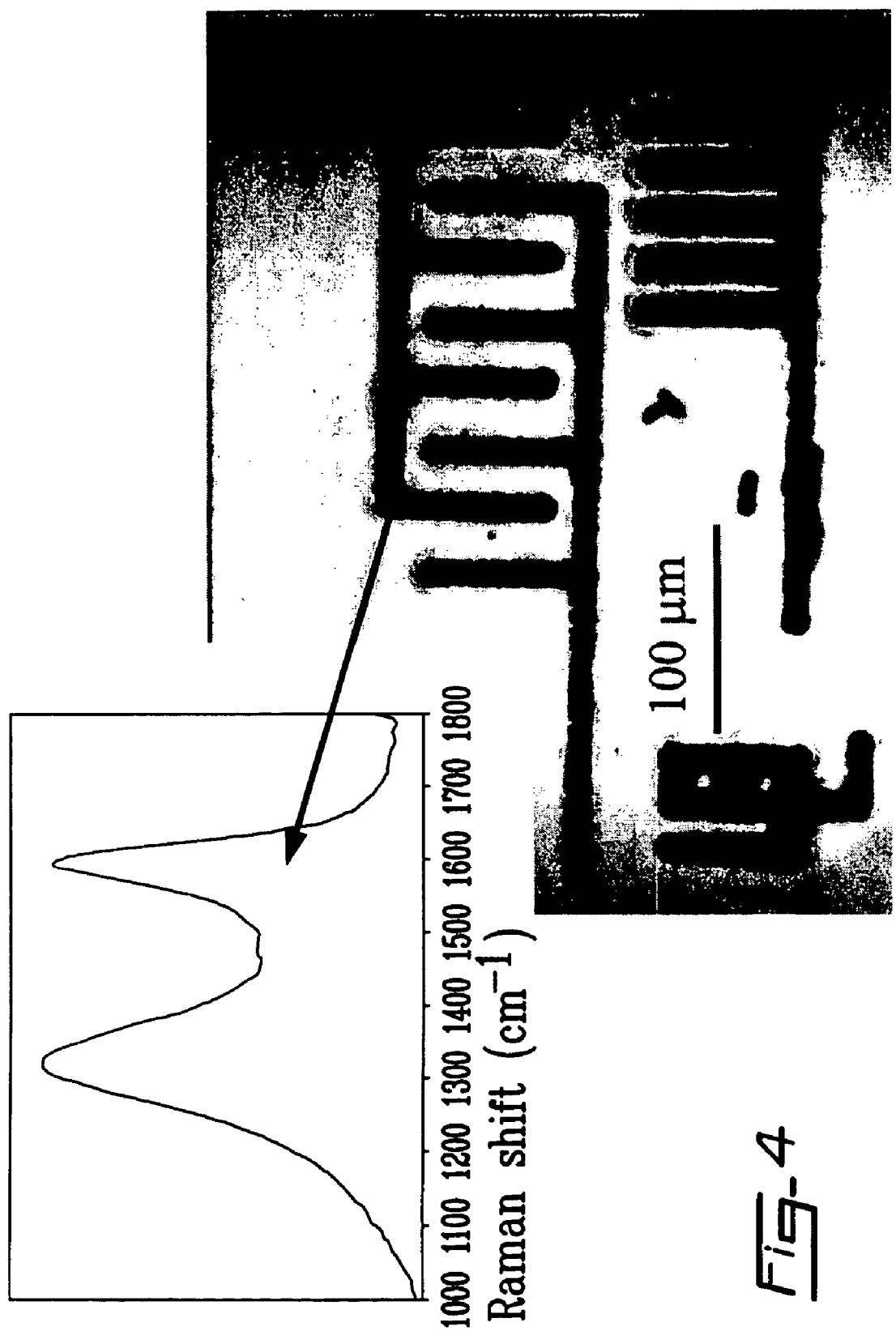

PROCESS FOR THE PREPARATION OF AN ELECTRODE FROM A POROUS MATERIAL, ELECTRODE THUS OBTAINED AND CORRESPONDING ELECTROCHEMICAL SYSTEM

TECHNICAL FIELD OF THE INVENTION

The purpose of the invention is to provide processes for the preparation of electrodes from a porous material, in particular processes for the preparation of electrodes involving the preparation of an alloy, and those processes during which the electrodes are at least partly coated with carbon.

It is also a purpose of the invention to provide electrodes which are obtained from a porous material or those which contain a porous material, in particular negative electrodes for lithium micro-batteries that contain porous silicon.

Another purpose of the present invention consists in any electrochemical system that contains at least one electrode that is obtained from a porous material, or one that contains a porous material, and more particularly electrochemical systems that contain micro-batteries made of at least one electrode according to the invention.

DESCRIPTION OF THE STATE OF THE ART

Generators based on polymer electrolytes that were recently developed use metallic lithium, sometimes sodium, or other alkali metals, as anode sheets. Alkali metals are malleable and can be used in the form of thin films as mentioned in the Patents CA-A-2,099,526 and CA-A-2,099,524.

However, when using metallic lithium or other alkali metals, there are some risks that lithium or the alkali metal may melt and that the electrochemical cell may be destroyed, in certain cases of extreme use, for example at temperatures higher than 100° Celsius. Moreover, under induced conditions of electrochemical cycling, the formation of dendrites, for example lithium dendrites, may take place, for example in the presence of recharge currents that are too high. The formation of dendrites is associated with many disadvantages, while the same alloy does not allow for the deposit of lithium or dendrite growth, when it operates at a more anodic voltage, for example at a voltage whose value is between +300 and 450 mVolts in the case of lithium aluminum vs lithium.

The use of alkali metal alloys, for example lithium, is thus described in the U.S. Pat. No. 4,489,143, in the case of generators that operate in molten salt media.

In organic media, and more particularly in a polymer medium, where the thicknesses of the electrode films are less than 100 micrometers, it becomes very difficult to use alloyed anode sheets (also called alloy based sheets). Indeed, the intermetallic compounds of lithium that can be used as anodes, such as LiAl, $Li_{21}Si_5$, $Li_{21}Sn_5$, $Li_{22}Pb_5$ and the like, are hard and brittle and cannot be laminated as it is the case with lithium or low alloyed lithium. On the other hand, it is mentioned in Canadian Patent 1,222,543, that these anodes can be prepared in the form of thin films by producing composites consisting of powders of the intermetallic compound bound by the polymer electrolyte, or still, in U.S. Pat. No. 4,590,840, that it is possible under certain conditions, to pre-lithiate the sheet of the host metal of the anode, by chemically treating the surface thereof or by electrochemically charging part of the sheet.

However, although these techniques are practical under certain conditions, they rely on reactive materials, and the pre-inserted alloys are often pyrophoric. In addition, they are not easily implemented and it is difficult to optimize their performances. When the anodes are prepared in discharged state, one of the major difficulties to overcome originates from the important voluminal variation which results from the formation of the alloy, which causes important stresses on the structure.

When an attempt is made to produce the alloy from a sheet of non-lithiated host metal, during the assembly or after the assembly of a polymer electrolyte generator, voluminal expansion of the structure in the direction of the thickness of the sheets could only be compensated by an appropriate design of the cell, for example by adapting the total increase of the thickness of the superimposed sheets, the more so because in the direction of the thickness, the variation is very small and is therefore much more negligible.

Known techniques for the preparation of micro-batteries in an electrochemical system are described in the conference, 1th ABA BRNO 2000, Advanced Batteries and Accumulators, Jun. 28.8-1.9, 2000 Brno University of technology, Antoniska 1, Brno, Czech Republic http://www.aba-brno.cz/aba2000/part_I/13-bludska.pdf, and in the reference: Bull. Master. Science, Vol. 26, No. 7, December 2003, pages 673-681 http://www.ias.ac.in/mastersci/bmsdec2003/673.pdf, and require the introduction of the micro-battery into the system.

A need therefore existed for new materials that can be used as constitutive element of an electrode and that are free of one or more of the disadvantages of the materials traditionally used in this application.

In particular, there was a need for a new electrode material having at least one of the following properties:
  a high capacity in mAh/gram;
  a high capacity in mAh/liter;
  a good capacity of cycling;
  a low rate of self-discharge; and
  a good environmental tolerance.

There was also a need for new electrode materials that are adapted for use in micro-technology, such as in micro-batteries.

Moreover, there was a need for electrodes in which there are very few cracks after manufacture and this, for purposes of longevity.

BRIEF DESCRIPTION OF THE DRAWINGS

FIG. 1-4 shows the mechanism for inserting lithium into silicon through a process according to the invention, with formation of a $Li_xSi_y$ alloy.

FIG. 2-4 shows the mechanism for the electrochemical formation, according to an embodiment of the invention, of porous silicon that is used as an anode for micro-batteries.

FIG. 3-4 relates to the manufacture of a micro-battery according to the invention starting with a porous silicon based electrode that is coated with carbon. The role of this carbon is to establish an electrochemical bridge between silicon and lithium. Moreover, carbon makes sure that the porous silicon based negative electrode is electronically conductive. It is also used to provide adhesion together of the particles of silicon during voluminal expansion.

Figure 1:
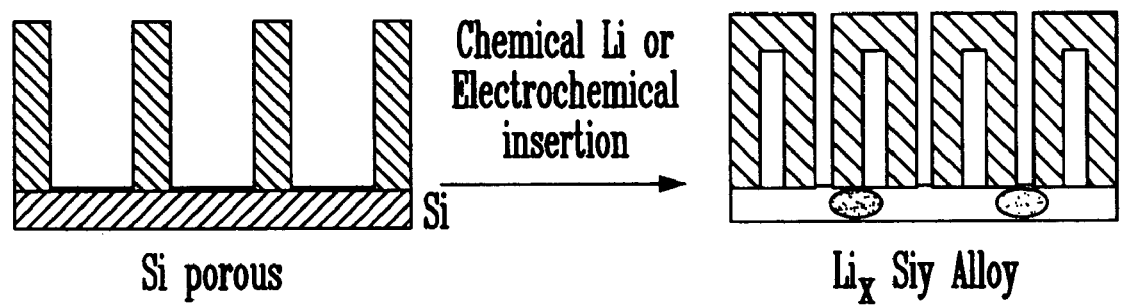

The various steps of this manufacture are the following:
  1—deposits of thin layers of photo-resist;
  2—placing a mask, and passing a UV beam to cross-link the desired zones;
  3—dissolving non cross-linked zones by chemical stripping;
  4—carbonizing the non stripped photo-resist (that will form the anode in the micro-battery);
  5—introducing the electrolyte, followed by the cathode;

6—cutting operation in stripped zones to provide micro-batteries.

FIG. 4-4 relates to an optical picture of a carbon structure obtained by laser pyrolysis of a layer of photo-resist. The top part of the graph represents a Raman spectrum of the carbon obtained.

SUMMARY OF THE INVENTION

Processes for preparing electrodes for electrochemical system from a porous material that allows the preparation of electrodes for electrochemical systems showing very interesting properties with respect to their physico-chemical as well as mechanical performances. The technology that is presented allows for the production of micro-batteries, directly in electrochemical circuits.

GENERAL DESCRIPTION OF THE INVENTION

A first object of the present invention resides is a process for the preparation of an electrode for an electrochemical system from a porous material. Preferably, the porous material used has a porosity, measured by the hereinafter referred to mercury method, that varies from 1 to 99%, terminals included. More advantageously still, the porosity of the material varies from 20 to 80%, terminals included.

According to an advantageous embodiment of the invention, the porous material used is such that the average pores found therein vary from 1 nanometer to 1 micrometer, terminals included. More preferably still, the size of the pores varies from 10 to 250 nanometers, terminals included.

According to another advantageous embodiment, distribution of the pores is substantially uniform. Preferably, this distribution is selected so that its d50 is between 100 and 150 nanometers.

The pores are advantageously present at the surface of the porous material and extend throughout said porous material. Preferably, the pores have a depth between 1 micrometer and 3 millimeters and said porous material has a thickness between 2 micrometers and 3.5 millimeters. It is desirable that most of the pores that are found in the porous material do not extend throughout the entire porous material.

According to another preferred embodiment, said porous material is selected among materials capable of providing an alloy with an alkali metal. Thus, the porous material may be selected from the group consisting of silicon, tin, aluminum, silver, gold, platinum and mixtures of at least two of these materials, when they are in porous condition.

Preparation of the alloy is carried out by chemical and/or electrochemical means.

It was surprisingly realized that particularly interesting results are obtained when the void ratio of the material used to prepare the electrode is such that the voids of the porous material can absorb the voluminal expansion generated during the production of the alloy with the alkali metal.

According to a particular embodiment of the invention, an anode is prepared from porous silicon.

An anode according to the invention may thus be obtained by preparation of an alloy from at least one source of porous silicon and at least one alkali metal selected from the group consisting of Li, Na, Ca and mixtures of at least two of these metals.

Advantageously, an anode is prepared from porous silicon, in which the porosity measured according to the mercury porosimeter method, varies from 5 to 95 volume %, terminals included. More advantageously still, the porosity of the silicon used is about 75 volume %.

The porous silicon used as porous material is obtained from a source of silicon selected from the group consisting of: silicon wafers, silicon pellets, silicon films and mixtures of at least two thereof.

Preferably, the porous silicon used as porous material is obtained from a silicon monocrystal.

According to an advantageous embodiment of the invention, the porous silicon is obtained from a source of silicon, by electrochemical treatment, in a bath comprising at least one salt, said salt preferably being selected from the group consisting of $NH_xF_y$ wherein X is 4 or 5 and Y is 1 or 2, more preferably still the selected salt is $NH_4F$.

By way of example, the treatment of the source of silicon contains at least one salt in solution, that is preferably a mixture of $H_2SO_4$, $NH_4F$ and $H_2O$, and at least one non aqueous solvent that is preferably an alcohol or a ketone, the non aqueous solvent(s) is (are) preferably selected from the group consisting of methanol, ethanol and acetone, and mixtures of at least two of these solvents.

Such a bath advantageously contains, in volume:
10 to 60% $NH_4F$;
5 to 20% methanol; and
75 to 20% $H_2O$.

Preferably, the alloy is based on porous silicon and is in the form of $Si_xLi_y$, wherein x represents a number between 1 and 5 and y represents a number between 5 and 21. More preferably still, in the alloy, x represents about 4 and y represents about 21.

According to an advantageous embodiment of the invention, the alloy produced is of the $Si_xLi_y$ type, and it is obtained electrochemically by contacting a source of silicon with lithium and/or metallic lithium in the form of sheets or wafers, at a temperature between 40 and 100° Celsius, preferably at a temperature of about 80° Celsius.

The time of contact of the source of silicon with lithium and/or metallic lithium in the form of sheets of wafers, is comprised between 1 and 12 hours, preferably, said time of contact is about 3 hours.

A second object of the present invention consists of the electrodes obtained by implementing a process according to any one of the processes described in the first object of the invention.

An advantageous sub-family of anodes according to the invention consists of the anodes containing at least 60 weight percent and preferably 40 weight percent of a porous material, preferably porous silicon.

Another particularly interesting sub-family consists of the anodes, which are at least partly coated with carbon.

The anodes and cathodes according to the invention are advantageous in that they are substantially free of cracks.

A third object of the present invention consists in electrochemical systems such as those that include at least one electrode as obtained by any one of the processes of production defined in the first object of the invention or as defined in the second object of the invention.

By way of preferred example of particularly preferred electrochemical systems, batteries in which the electrolyte is of the liquid, gel, or polymer type, may be mentioned.

In these batteries, the cathode is preferably of the type $LiCoO_2$, $LiFePO_4$, $LiNiO_2$, $LiNi_{0.5}Mn_{0.5}O_2$, $LiNi_{0.33}Mn_{0.33}O_2$, and the cathode is preferably of the 1 to 5 Volts type.

Batteries of the rechargeable type, providing particularly significant performances, may thus be obtained. Preferably they are of the lithium ion type.

A sub-family of batteries of the invention that are of interest consists of those in the form of micro-batteries, preferably those whose dimensions are between 1 mm² and 10 cm², and which possess at least one of the following electrochemical properties:
  electrochemical capacitance higher than 1 µWh;
  cycling capacity higher than 500, preferably higher than 100 cycles;
  self-discharge rate lower than 5%, preferably lower than 4%, more preferably still lower than 3%; and
  a life span, measured by the storage test carried out under ambient conditions, that is higher than 3 years, preferably higher than 5 years.

A fourth object of the present invention relates to the use of the electrodes, and preferably the anodes of the invention, in an electrochemical system.

Preferably, the anode is used as negative electrode for lithium micro-batteries.

A fifth object of the present invention relates to processes for the manufacture of an electrode, that is based on porous silicon and is at least partly coated with carbon, as obtained by thermal pyrolysis of a polymer layer, that is preferably deposited as a thin layer on a preferably insulating support made of porous silicon such as $Si_3N_4$. Pyrolysis of the polymer is advantageously carried out at a temperature between 600 and 1100° C. and, preferably, for a period of time between 30 minutes and 3 hours.

According to another variant of the invention, when implementing the process of manufacture of an electrode based on porous silicon and which is at least partly coated with carbon, there is provided a laser pyrolysis of a polymer layer preferably coated as a thin layer on a silicon (insulating) support. The beam used preferably has an intensity of between 10 and 100 milliwatts and it is preferably placed at a distance of between 0.5 micrometers and 1 millimeter from the silicon support. The layer of photo-resist is carbonized by laser pyrolysis by exposing the layer to the latter, which means that the C—H—O functions are converted into carbon. Preferably, the exposition is carried out for a period of time between 1 second and one minute. Preferably, the silicon support consists of a silicon monocrystal and it has a thickness between 100 microns and 3 millimeters.

A sixth object of the present invention consists of the electrodes obtained by implementation of one of the processes defined in the fourth object of the invention.

A seventh object of the present invention consists of the electrochemical systems including at least one electrode according to the fifth object of the invention.

DESCRIPTION OF PREFERRED
EMBODIMENTS OF THE INVENTION

The present invention concerns the use of a porous material in a micro-battery. More particularly, the invention relates to an electrochemical generator including a negative electrode comprising a porous host metal, such as silicon. The host sheet metal being intended to later on constitute a negative electrode and having the property of absorbing the lateral expansion and of substantially preventing any change in the plane of the porous metal during formation of an alloy between the host metal and the alkali metal.

For example, after formation of the lithium host metal alloy, the alloy cracks when there is electrochemical activity. The possibility of a voluminal expansion plays a preponderant role for the integrity of the electrode.

Porous silicon is thus advantageously used in this technology, as the active material that constitutes the anode for a Li-ion battery. The theoretical capacitance of porous silicon is 1970 mAh/grams and 2280 mAh/l.

The voluminal expansion associated with the alloy of silicon and lithium is preferably between 30 and 40%. Thus, the voids formed in porous silicon are used for compensating the voluminal expansion of the Li and Si based alloy.

Figure 2:
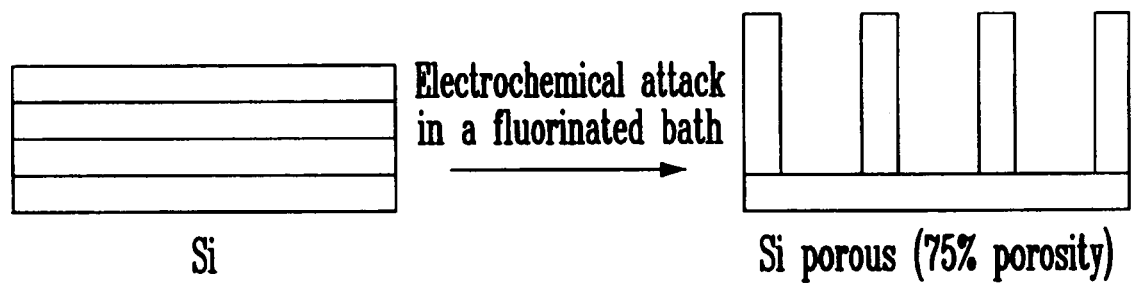
Figure 3:
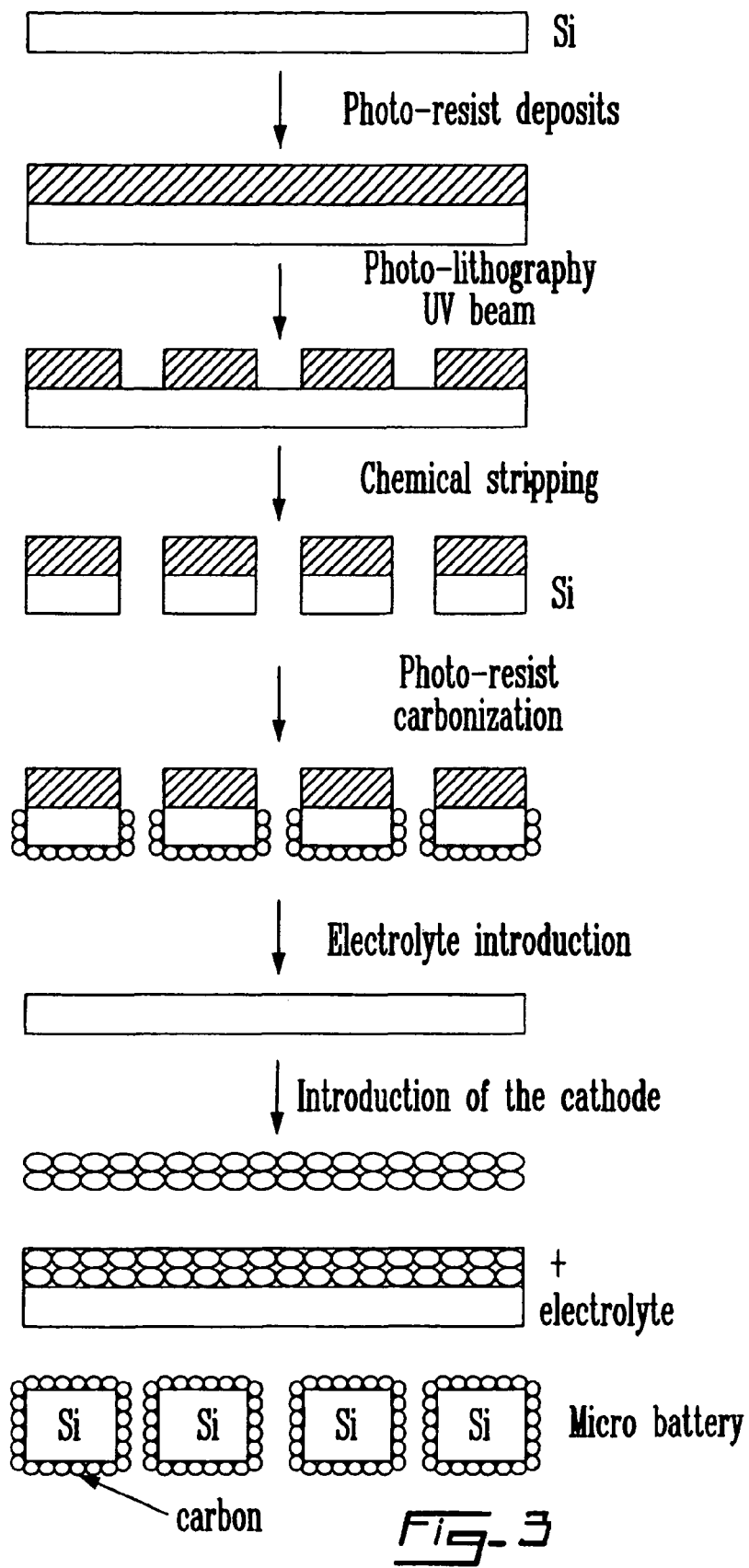

The mechanism for chemical or electrochemical insertion of lithium into porous silicon, according to an embodiment of the invention, is illustrated in FIG. 1-4.

The empty space generated by the porosity of silicon is occupied by the voluminal expansion of the $Si_xLi_y$ alloy, wherein x varies from 1 to 5 and y varies from 4 to 21. Preferably, the alloy has the formula $Li_2Si_5$.

Preparation of Porous Silicon

Within the framework of the processes for preparing porous silicon according to the invention, a mixture of $NH_4F$ is advantageously used to dissolve Si and $SiO_2$ that are present as impurities.

Porous silicon is obtained by electrochemical means in an electrolyte based on $NH_4F$ (50%)+$H_2O$+Methanol in a ratio of (2:2:1), the addition of methanol allows the formation of hydrogen at the surface. The void ratio is calculated according to the rate of blending of lithium that is proportional to the voluminal expansion of the $Si_xLi_y$ alloy. Porosity is measured by the mercury method described in the reference: The Powder Porosity Characterisation La bat NYS College of Ceramics at Alfred University, Jun. 18, 2002, http://nyscc.alfred.edu/extemal/ppc/ppc.html.

This technique is described more in detail in the field of semi-conductors http://etd.caltech.edu/etd/available/etd-08062002-192958/unrestricted/Chapter3.pdf, in chapter 3 of the Ph.D thesis entitled Effects OF SURFACE MODIFICATION ON CHARGECARRIER DYNAMICS AT SEMI-CONDUCTEUR INTERFACES by Agnes Juang, 2003, California Institute of Technologie Pasadena, Calif.

On the other hand, it was surprisingly found that micro-batteries, according to the invention, using micro-electrodes containing carbon and based on porous silicon, can be manufactured by different original techniques explained hereinafter in detail.

The technique in question is thermal pyrolysis, or one obtained by laser means, of the heteroatoms of the type N or O that are present at the surface of silica, and that were deposited as thin layers on the insulating material also called "the insulator".

The two techniques imply the conversion of the C—H—O functions into carbon, however they differ in procedure with respect to the formation of microstructures that constitute the microelectrodes in the micro-battery. In the two techniques, the starting material is preferably commercial silicon called dense silicon that is available in the form of wafers.

According to an advantageous approach, the techniques for the preparation of semi-conductors imply the "patterning" of carbon by photolithographic methods involving a photo mask that is used to "model" the electrode structures, that can be interdigitized electrode surfaces.

First Technique for Preparing an Electrode Based on Porous Silicon

A conventional "wafer" transfer silicon with an insulating layer may be used as substrate for the microelectrodes. According to this innovative approach, carbon electrodes are formed from regular photo-resists by heat treatment (normally at temperatures of 600 to 1100° Celsius in an inert atmosphere during one hour) that carbonizes them and makes the photo-resist electrically conductive.

The electrochemically active electrode materials may be selectively deposited on the carbons by electrochemical methods, and for certain applications, carbon itself may be used as electrode.

The process that is used to manufacture micro-electrode structures rely on a series of steps. In the first step, a fine layer of $Si_3N_4$ (about 100 nm) is deposited by chemical vapor deposit (CVD), which is used as insulator to separate the conductive silicon "wafer" from the carbonated structure. Subsequent steps involving spin coating, "patterning" and photo-resist pyrolysis, are used to form the final carbonated structure. The negative as well as the positive photo-resist are used to form the carbonated conductive micro-electrodes.

These techniques are described in the references: 253, IMLB 12 Meeting, 2004 The Electrochemical Society, Journal of Power Sources, Volume: 89, Issue: 1, July, 2000 and Applied Physics Letters Vol 84(18) pp. 3456-3458. May 3, 2004.

Second Technique for Preparing an Electrode Based on Porous Silicon

The second approach does not involve the use of a photo mask. Indeed, only a narrow laser beam with "path" is used, and the latter is controlled to move according to a specific "path" trajectory. Control of the movement of the laser beam on the surface of the photo-resist by computer control authorizes the preparation of a wide variety of micro-electrode devices comprising channels. The power intensity of the laser vapor is controlled so as to prevent vaporization of the photo-resist, instead of its conversion into carbon, and this also minimizes the loss of carbon by laser ablation. In a subsequent step, the photo-resists that have not reacted in certain portions that are not exposed to laser vapor, are dissolved to leave only the carbonated micro-electrodes on the silicon wafer. Radiation from the laser beam can convert the photo-resist polymer into carbon. Similarly, results that are comparable to those obtained by thermal pyrolysis, are obtained by using a Raman spectrum.

The document How Semiconductors are made E. Reichmanis and O. Nalamasu, Bell Labs, Lucent Technologies, Intersil, 20,06,2003, Intersil Corporation Headquarters and Elantec Product Group, 675 Trade Zone Blvd, Milpitas, Calif. 95035 describes silicon wafers (and their preparation) that can be used within the framework of the present invention.

The document of Martin Key, entitled SU-8 Photosensitive Epoxy, CNM, Campus UAB, Bellaterra 08193, Barcelona, Spain (http://www.cnm.es/projects/microdets/index.html) illustrates methods allowing to deposit a carbonated polymer on silicon wafers.

The document Direct Measurement of the Reaction Front in Chemically Amplified Photoresists, E. Reichmanis and O. Nalamasu, Bell Labs, Lucent Technologies, Sciences, 297, 349 (2002) describes currently used methods for attacking selected zones of photo-resists.

The content of these three documents is incorporated by reference into the present application.

EXAMPLES

Carbon Micro-Structures Obtained by Laser Pyrolysis of Photo-Resist are Described Hereinafter A photo-resist (Oir 897-101, Olin Corp., Norwalk, Conn.) was used to produce a thin film of an organic precursor on a Si substrate. A Labram Raman microscope integrated system manufactured by the group ISA Horiba was used for a laser pyrolysis treatment of the photo-resist, and also to analyse the structure of the carbonated product.

The excitation wave length was either supplied by internal HeNe (632 nm), a laser mW or by an external Ar-ion (514 nm), 2/Laser. The power of the laser beam was adjusted to the desired levels with neutral filters of diverse variable optical densities.

The size of the laser beam at the surface of the sample can be modulated from 1.6 up to a few hundreds of microns; and it is controlled by the characteristics of the optical microscopes and the distance between the sample and the lenses. The diameter of the laser beam that is used for our experiments was 5 microns. To control the position of the sample with respect to the laser beam, a XY microscope with motorized scanning and a resolution of 0.1 micron, was used. The time of exposure of the photo-resist to the laser beam was controlled either by the scanning speed XY, or by a shutter digital laser beam (model 845 HP by Newport Corp.), which was used in static experiments.

Control of the movement of the sample of photo-resist—Si by the computer program makes it possible to design a wide variety of micro-electrodes in the form of rows.

The power density of the laser beam should be regulated in order to prevent vaporization of the photo-resist without converting it into carbon or to minimize carbon loss by laser ablation.

Four layers of a positive photo-resist were coated on a Si wafer, after which they were baked at 150 degrees Celsius. An optical picture that illustrates the result obtained by laser pyrolysis for the production of a carbon structure from a positive photo-resist, is shown in the annexed FIG. 4-4. A laser operating at 632 nm, and with a beam size of 5 micrometers and a capacity of 8 mW, was used to produce the modeled carbons. A computer program was used to control the movement of the sample and to form the carbon configurations. The movement speed of the motorized sample XY was 8 mm per second. The width of the print in the interdigitalized structure was about 20 micrometers. It is slightly wider than the carbon bond that connects them together since each finger was exposed twice to the laser beam. The Raman spectrum of the carbon positioned on one of the fingers is shown on the same FIG. 4-4. It is remarkably similar to the one obtained by standard thermal pyrolysis of the same photo-resist at 1000 Celsius. These preliminary results show that micro-electrodes of carbon having a Raman spectrum that compares to those obtained by heat treatment, are easily obtained.

A new highly performing technology which is based on the use of laser is thus proposed for the preparation of capacitances whose size is adapted to electronic devices of small size.

This new method of the invention called—direct laser lithography (DDL)—permits the production of micro-electrodes from organic and inorganic precursors, that are adapted for Li-ion batteries and the production, from any type of substrate, of functional micro-batteries that are completely rechargeable.

Versatility of the DLL technology allows for the production on request of micro-power sources that can be distributed and directly integrated to electronic components.

Moreover, the DDL technology requires no photo masking to give the desired configuration to the micro-electrodes.

Consequently, DLL may produce a design of micro-battery more rapidly than conventional photolithography. The micro-batteries thus produced provide improved specific energy and capacity by reason of their weight and their reduced volumes, when the electronic substrate becomes part of the elements of the battery.

The cathode may be prepared from a target of cathode material preferably selected from the group consisting of $LiCoO_2$, $LiMn_2O_4$, $LiMn_{1/3}Ni_{1/3}Co_{1/3}O_2$, $LiMn_{1/2}Ni_{1/2}O_2$, $LiMPO_4$ (M=Fe, Co, Ni, Mn) and mixtures of at least two of these materials, preferably the target material is pressed, the laser is applied on the target at capacities that can vary from 20 mW to 2 W to produce the porous material that constitutes the cathode that is thereafter stripped from the target with a laser and deposited on the porous Si/carbon/electrolyte half battery.

A second technique for preparing the cathode using a laser, is carried out from a compound in paste form prepared from a mixture of a cathode powder and a carrier solution that is preferably toluene, heptane or a mixture thereof. The pasty solution is coated on a support plate that is preferably made of glass and placed 100 µm from the substrate (silicon or others). The UV radiation laser beam is applied through the support plate and the cathode is projected on the substrate by pyrolysis.

Although the present invention has been described by means of specific embodiments, it is understood that many variations and modifications can be associated with said embodiments, and the present invention aims at covering such modifications, uses or adaptations of the present invention following in general, the principles of the invention and including any variation of the present description that will become known or is conventional in the field of activity in which the present invention resides, and which may apply to the essential elements mentioned above, in accordance with the scope of the following claims.

The invention claimed is:

1. Process for the preparation of a cathode, the process comprising:
    preparing a paste solution by mixing a cathode powder with a carrier solution, of toluene, heptane or a mixture of at least two thereof;
    coating the paste solution on a plate support made of glass placed a distance from a substrate of silicon;
    applying a UV radiation laser beam through the plate support and projecting the cathode on the substrate by pyrolysis,
    wherein the cathode comprises a porous material.

2. Process for the preparation of a cathode according to claim 1 in which the porosity of said porous material, measured by mercury porosimetry, varies from 1 to 99%, endpoints included.

3. Process for the preparation of a cathode according to claim 2 in which the porosity of said material varies from 20 to 80%, endpoints included.

4. Process for the preparation of a cathode according to claim 1 in which the average size of the pores in said porous material varies from 1 nanometer to 1 micrometer, endpoints included.

5. Process for the preparation of a cathode according to claim 4 in which the size of the pores varies from 10 to 250 nanometers, endpoints included.

6. Process for the preparation of a cathode according to claim 1 in which the distribution of the pores is substantially uniform.

7. Process for the preparation of a cathode according to claim 1 in which the pores are located at the surface of the porous material and extend throughout said porous material.

8. Process for the preparation of a cathode according to claim 1 in which said pores do not extend entirely throughout the porous material.

9. The process for the preparation of a cathode according to claim 1, wherein the plate support made of glass is placed 100 µm from the substrate of silicon.

10. Process for the preparation of a cathode, the process comprising:
    pressing a target of cathode material, said cathode material is selected from the group consisting of $LiCoO_2$, $LiMn_2O_4$, $LiMn_{1/3}Ni_{1/3}Co_{1/3}O_2$, $LiMn_{1/2}Ni_{1/2}O_2$, $LiMPO_4$, wherein M is Fe, Co, Ni or Mn, and mixtures of at least two thereof,
    applying a laser on the target at capacities varying from 20 mW to 2 W to produce the porous material that constitutes the cathode,
    stripping the cathode material from the target with a laser, and
    depositing the porous cathode material on a porous Si/carbon/electrolyte half-battery.

11. Process for the preparation of a cathode according to claim 10, in which the porosity of said porous material, measured by mercury porosimetry, varies from 1 to 99%, endpoints included.

12. Process for the preparation of a cathode according to claim 11 in which the porosity of said material varies from 20 to 80%, endpoints included.

13. Process for the preparation of a cathode according to claim 10 in which the average size of the pores in said porous material varies from 1 nanometer to 1 micrometer, endpoints included.

14. Process for the preparation of a cathode according to claim 13 in which the size of the pores varies from 10 to 250 nanometers, endpoints included.

15. Process for the preparation of a cathode according to claim 10 in which the distribution of the pores is substantially uniform.

16. Process for the preparation of a cathode according to claim 10 in which the pores are located at the surface of the porous material and extend throughout said porous material.

17. Process for the preparation of a cathode according to claim 10 in which said pores do not extend entirely throughout the porous material.

18. Electrochemical system, the electrochemical system being a battery comprising:
    at least one cathode obtained by implementing a process comprising:
    pressing a target of cathode material, said cathode material is selected from the group consisting of $LiCoO_2$ $LiMn_2O_4$ $LiMn_{1/3}Ni_{1/3}Co_{1/3}O_2$, $LiMn_{1/2}Ni_{1/2}O_2$, $LiMPO_4$, wherein M is Fe, Co Ni or Mn and mixtures of at least two thereof,
    applying a laser on the target at capacities varying from 20 mW to 2 W to produce the porous material that constitutes the cathode,
    stripping the cathode material from the target with a laser, and
    depositing the porous cathode material on a porous Si/carbon/electrolyte half-battery, at least one anode, and at least one electrolyte.

19. Electrochemical system according to claim 18, in which the electrolyte is a liquid, gel, or polymer.

20. Electrochemical system, the electrochemical system being a battery comprising:
    at least one cathode obtained by implementing a process comprising:
    preparing a paste solution by mixing a cathode powder with a carrier solution, of toluene, heptane or a mixture of at least two thereof;
    coating the paste solution on a plate support made of glass placed a distance from a substrate of silicon;
    applying a UV radiation laser beam through the plate support and projecting the cathode on the substrate by pyrolysis,
    wherein the cathode comprises a porous material, at least one anode, and at least one electrolyte.

21. Electrochemical system according to claim 20, in which the electrolyte is a liquid, gel, or polymer.

* * * * *